United States Patent [19]

Pikon et al.

[11] 4,290,980
[45] Sep. 22, 1981

[54] MASS EXCHANGER WITH PACKAGING

[75] Inventors: Jerzy Pikoń, Gliwice; Jan Hehlmann, Kędzierzyn-Koźle, both of Poland

[73] Assignee: Politechnika Slaska im. Wincentego Pstrowdkiego, Gliwice, Poland

[21] Appl. No.: 138,525

[22] Filed: Apr. 8, 1980

Related U.S. Application Data

[63] Continuation of Ser. No. 954,213, Oct. 24, 1978, abandoned, which is a continuation of Ser. No. 797,863, May 17, 1977, abandoned.

[30] Foreign Application Priority Data

Jun. 12, 1976 [PL] Poland .................................. 190405

[51] Int. Cl.$^3$ .............................................. B01F 3/04
[52] U.S. Cl. ........................................ 261/94; 55/90; 202/158; 261/DIG. 72; 422/310
[58] Field of Search .................................. 261/94–98, 261/103, 106, 112, DIG. 11, DIG. 54, DIG. 72; 210/150, 151; 202/158; 55/90; 428/116–118, 131, 132; 422/310

[56] References Cited

U.S. PATENT DOCUMENTS

| | | | |
|---|---|---|---|
| 3,013,781 | 12/1961 | Haselden | 261/112 |
| 3,039,749 | 6/1962 | Kohl et al. | 261/112 |
| 3,227,429 | 1/1966 | Renzi | 261/112 |
| 3,343,821 | 9/1967 | Winn et al. | 261/112 |
| 3,347,024 | 10/1967 | Dock et al. | 261/DIG. 54 |
| 3,402,105 | 9/1968 | Sze | 261/112 X |
| 3,450,393 | 6/1969 | Munters | 261/112 |
| 3,489,208 | 1/1970 | Manteufel | 261/DIG. 72 |
| 3,491,892 | 1/1970 | McCann | 261/112 |
| 3,724,825 | 4/1973 | Streck | 261/112 X |
| 3,796,657 | 3/1974 | Pretorius et al. | 261/DIG. 72 |
| 4,014,962 | 3/1977 | Del Notario | 261/112 |

FOREIGN PATENT DOCUMENTS

| | | |
|---|---|---|
| 500583 | 6/1930 | Fed. Rep. of Germany ........ 261/94 |
| 67968 | 7/1969 | Fed. Rep. of Germany . |
| 1542242 | 8/1973 | Fed. Rep. of Germany . |

OTHER PUBLICATIONS

Fuller et al.; "A New Plastic Packing for Cooling Towers"; Chemical Engineering Progress; Oct. 1957, vol. 53, No. 10, pp. 501–505.

Primary Examiner—Richard L. Chiesa
Attorney, Agent, or Firm—Haseltine & Lake

[57] ABSTRACT

A mass exchanger with a cellular packing in form of checkerworks forming cells bent in the lower part forming the gaps. The bends of the cells are of radial or skew type. The checkerworks are formed by single or duplex walls. Alternate checkerworks are turned in relation to each other at about an angle of from 0° to 90°, an advantageous angle is 45°.

1 Claim, 5 Drawing Figures

MASS EXCHANGER WITH PACKAGING

This is a continuation of application Ser. No. 954,213, filed Oct. 24, 1978, now abandoned, which is a continuation of Ser. No. 797,863, filed May 17, 1977, now abandoned.

BACKGROUND OF THE INVENTION

The subject of the invention is a mass exchanger with a packing for carrying out such operations, as: absorption, desorption, distillation, rectification, humidification or drying of gases, extraction, gas-collecting, as well as indirect heat exchange. In a known mass exchanger such described by Thaddaeus Hobler in Diffuse Mass Mobility and Absorbers, WNT, Warsaw, 1976, scrubbers packed with Raschig rings, Berl saddles, Pall rings, Bialecki rings or checker works are built in form of columns; Also see U.S. Pat. No. 3,576,317; GFR, Pat. No. 1,226,077; and GDR, Pat. No. WP 67968. The packing is sprinkled from above with a liquid flowing through the surfaces of the packing down a column.

A gas being treated is fed from below and flows through the packing, being in contact with a liquid film. The packing containing scrubbers have a disadvantage, in that the rates of gas flow on free section are low; also, what is connected is a low intensity of the mass exchange process and the dimensions of the apparatus are considerable. For the large sections of the apparatus a corresponding large amount of liquid is required to protect a suitable sprinkling of the surface of packing. An apparatus of this type is characterized by a low elasticity and is further limited by a possibility of being choked i.e. throttled by suitable sprinkling of the surface of packing, as well as by so-called canaliculator. With scrubbers of high heights it is necessary to divide the column, or to apply guidance plates for centripetal leading to the liquid from the wall.

Plate columns in form of bubble-cap plates, perforated plates, screen plates, valve plates and so on, were also used for the mass exchange see, GFR Patents: Nos. 1,176,099 and 1,203,736. Foam apparatus can act only under certain determinated conditions, that is, when a foam occurs the application range of such equipment is considerably reduced. Due to considerable dimensions of an apparatus many difficulties appear in keeping up any desirable liquid level on the plate; moreover, breakdowns may also occur by gas effusion. Venturi tubes can have a fault and large flow rates, occurring in this case, cause a extensive corrosion which in turn cause a large reduction of pressure. In turn, this causes some difficulties as to the selection of ventilators.

SUMMARY OF THE INVENTION

The main object of the present invention is to overcome the defects of the prior art.

Still another object of the invention is to provide a mass exchanger with cellular packing having grates of a predefined character to eliminate the need for sprinkling large surfaces in the exchanger and of supplying small cells with water of insignificant amounts.

A further object is to provide a mass exchanger which employs flow rate velocities of a lower magnitude when compared to the prior art.

These objects and other advantages, will be ascertained from the accompanying specification, claims and drawings.

The mass exchanger, according to the invention, has a cellular packing in form of checkerworks, which form cells; moreover, the cells are bent in your lower part, forming gaps. The cells have in its lower part radial and skew bends. The checkerworks are formed of single and duplex walls. The alternate checkerworks are turned in relation to each other about an angle of from 0° to 90°, an advantageous angle is 45°.

IN THE DRAWINGS

PREFERRED EMBODIMENT

Figure 1:
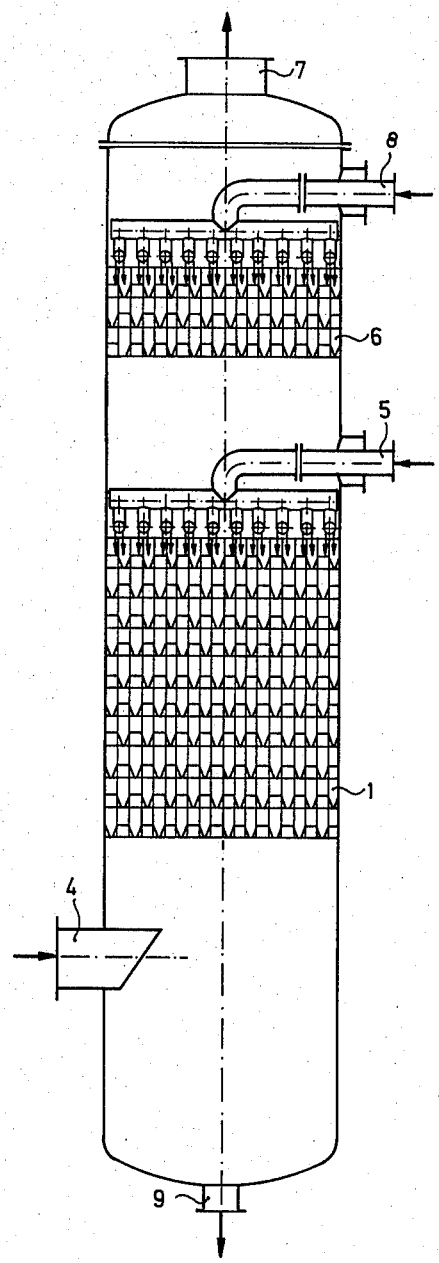
FIG. 1 illustrates longitudinal section of the mass exchanger with a cellular packing.

As seen from FIG. 1, the gas being treated is led through the stub pipe 4, in the lower part of the scrubber. A packing is placed in the middle part of the scrubber, which is sprinkled from above with the liquid, supplied to individual packings cells with the help of a sprinkler 5. A strong turbulence of the liquid on the packing is carried out and the mass exchange. Subsequently, the gas treated flows to a condenser 6 consisting of the same packing as in the middle part. There the condensation of the gas takes place. The gas condensed flows off through the stub pipe 7 placed in the upper part of the apparatus.

The deposition of solid bodies in the condenser can be removed by washing i.e. scrubbing, with the help of the liquid led from the sprinkler 8. The liquid flowing down from the packing is drained off from the scrubber through the stub pipe 9, placed in the lower part of the apparatus.

Figure 2:
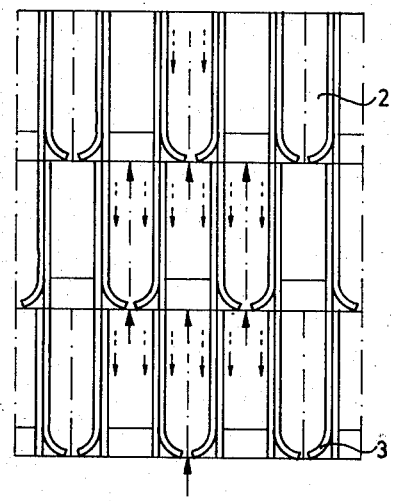
FIG. 2 illustrates a longitudinal section of a packing containing duplex walls with cells bent in a radial form.
Figure 3:
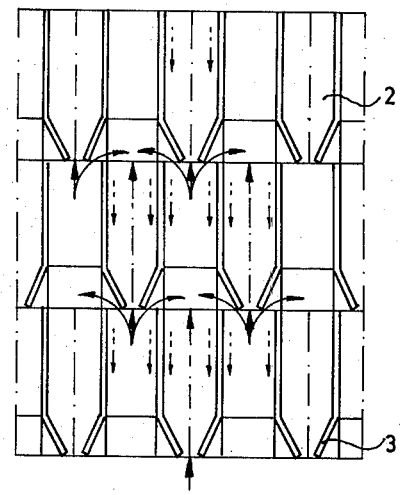
FIG. 3 illustrates a longitudinal section of a packing with single walls containing skew bend in its lower part.
Figure 4:
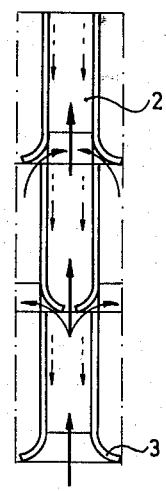
FIG. 4 illustrates a longitudinal section of a packing with single walls having cells bent in a radial form, and grates turned in relation to each other, about an angle 45°.
Figure 5:
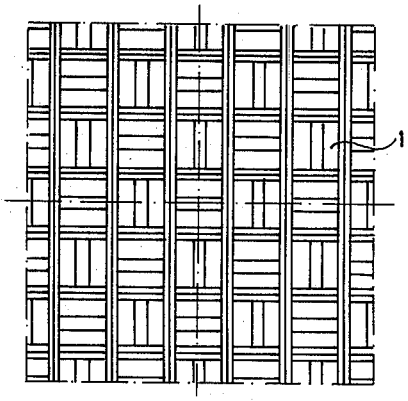
FIG. 5 illustrates a longitudinal section of a packing with duplex walls.

In FIGS. 2-4 the same numerals are provided for the respective cells 2 and gap 3. Such elements are common to the structure of all of the aforementioned FIGS. 2-4.

In the mass exchanger, according to the invention, very high gas rates can be used, for example, up to 7 m/s. No chocking throttling of the apparatus has been observed at such operating conditions. With low rates, caused by small existing liquid cells which are formed on the surface of walls, as well as during the action of the exchanger, no negative changes in characteristics of the interphase processes were observed. The packing in the exchanger according to the invention, assures flexibility in the working of the equipment, i.e. rates of flow changing considerably from 0.5 to 7 m/s. This has a great practical importance. The intensity of the liqud flow can change considerably and it can be reduced in relation to traditional scrubbers to a favorable value as compared to the other scrubbers. Because according to the invention, there is no need for sprinkling large surfaces in the exchanger, and supplying the small cells with insignificant amounts of the liquid.

Many modifications and variations of the present invention as possible in light of the above teachings. It is, therefore, to be understood that within the scope of the appended claims, the invention may be practiced otherwise than as particularly described.

We claim:

1. A mass exchanger apparatus with a packing, said apparatus being defined by a chamber, inlet means connected to said chamber for directing fluid into said chamber interior; packing disposed in said chamber for contacting said fluid to act thereon; means for further treating said fluid; outlet means to direct said finally treated fluid outside of said chamber; and including a cellular packing the form of a checkerwork matrix defining perpendicular cells open at a top part thereof and having a bottom part provided with skew bends, said cells having gaps so formed at the bottom part by the skew bends permitting accumulation of liquid in said cells, said gaps are disposed to permit gas flow therethrough causing liquid in said cells to be foamed and excess liquid to be deflected by said bends and travel from said upper part to said bottom part.

* * * * *